(12) United States Patent
Kodaira

(10) Patent No.: US 8,857,068 B2
(45) Date of Patent: Oct. 14, 2014

(54) ROTARY LASER IRRADIATING SYSTEM AND ROTARY LASER SYSTEM

(75) Inventor: Jun-ichi Kodaira, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 240 days.

(21) Appl. No.: 13/634,256

(22) PCT Filed: Mar. 11, 2011

(86) PCT No.: PCT/JP2011/056501
§ 371 (c)(1),
(2), (4) Date: Sep. 12, 2012

(87) PCT Pub. No.: WO2011/118511
PCT Pub. Date: Sep. 29, 2011

(65) Prior Publication Data
US 2013/0000133 A1    Jan. 3, 2013

(30) Foreign Application Priority Data
Mar. 25, 2010 (JP) .................................. 2010-70983

(51) Int. Cl.
*G01C 15/00* (2006.01)

(52) U.S. Cl.
CPC ............ *G01C 15/004* (2013.01); *G01C 15/008* (2013.01)
USPC ......................................................... 33/290

(58) Field of Classification Search
CPC .. G01C 15/008; G01C 15/116; G01C 15/004; G01C 15/002; G01C 15/00; G01C 5/00
USPC ...................................................... 33/290, 291
See application file for complete search history.

(56) References Cited

U.S. PATENT DOCUMENTS

| | | | | |
|---|---|---|---|---|
| 4,221,483 A | * | 9/1980 | Rando | 356/250 |
| 4,993,161 A | * | 2/1991 | Borkovitz | 33/291 |
| 5,898,490 A | | 4/1999 | Ohtomo et al. | |
| 5,946,087 A | | 8/1999 | Kasori et al. | |
| 6,108,075 A | | 8/2000 | Otomo et al. | |

(Continued)

FOREIGN PATENT DOCUMENTS

| JP | 9-257478 A | 10/1997 |
|---|---|---|
| JP | 10-206157 A | 8/1998 |

(Continued)

OTHER PUBLICATIONS

International Search Report and Written Opinion mailed May 17, 2011 in corresponding PCT application No. PCT/JP2011/056501.

(Continued)

*Primary Examiner* — Christopher Fulton
(74) *Attorney, Agent, or Firm* — Nields, Lemack & Frame, LLC

(57) ABSTRACT

A rotary laser irradiating system, comprising a light emitting unit (41, 42) for emitting a laser beam, a rotator for forming a reference plane by projecting the laser beam by rotary irradiation, a tilt driving unit (21) for tilting the reference plane, a control unit (35) for controlling a light emission of the light emitting unit, and a tilted axis indicating means (35, 44) for turning off the laser beam so as to form a tilted reference axis indicating range in a tilt setting reference axis direction for setting a tilt.

16 Claims, 13 Drawing Sheets

(56) References Cited

U.S. PATENT DOCUMENTS

| | | | |
|---|---|---|---|
| 6,646,732 B2* | 11/2003 | Ohtomo et al. | 356/141.5 |
| 6,756,581 B2* | 6/2004 | Ohtomo et al. | 250/231.13 |
| 6,763,595 B1* | 7/2004 | Hersey | 33/286 |
| 7,433,028 B2* | 10/2008 | Kumagai et al. | 356/139.03 |
| 8,307,562 B2* | 11/2012 | Bascom et al. | 33/286 |
| 8,407,903 B2* | 4/2013 | Koleszar et al. | 33/285 |
| 2002/0027007 A1* | 3/2002 | Ohtomo et al. | 172/2 |
| 2007/0103672 A1* | 5/2007 | Kumagai et al. | 356/139.03 |
| 2008/0231839 A1* | 9/2008 | Yamazaki et al. | 356/72 |

FOREIGN PATENT DOCUMENTS

| | | |
|---|---|---|
| JP | 11-166832 A | 6/1999 |
| JP | 11-257960 A | 9/1999 |
| JP | 3582918 B | 10/2004 |

OTHER PUBLICATIONS

International Preliminary Report on Patentability issued Oct. 2, 2012 in corresponding PCT application No. PCT/JP2011/056501.

* cited by examiner

[CALCULATION OF COMPOSITE TILT ANGLE]

ROTARY LASER IRRADIATING SYSTEM AND ROTARY LASER SYSTEM

TECHNICAL FIELD

The present invention relates to a rotary laser irradiating system for projecting a laser beam by rotary irradiation to form a reference plane, and more particularly to a rotary laser irradiating system and a rotary laser system that can align a direction of a main unit for projecting a laser beam by rotary irradiation to coincide with a direction of a target reflector.

BACKGROUND ART

A rotary laser irradiation system projects a laser beam by rotary irradiation to form a horizontal reference plane or a tilted reference plane tilted with respect to a horizontal plane. Further, a tilt angle of a tilted plane is set with respect to a horizontal reference line, and hence a direction of the reference line (which will be referred to as a tilt direction hereinafter) must be first set.

Referring to FIG. 15, a conventional method of setting a tilt direction of a tilted plane will now be described hereinafter.

In FIG. 15, reference numeral 1 denotes a rotary laser irradiating system, and reference numeral 2 denotes a photodetection device. The rotary laser irradiating system 1 has a rotator 3 for deflecting a laser beam to a horizontal direction and for projecting the deflected laser beam by rotary irradiation, a main unit 4 having a function of emitting the laser beam, of tilting the rotator 3, and of tilting an irradiating direction, and a main unit rotator 5 for rotating the main unit 4 in the horizontal direction. When the laser beam is projected from the rotator 3 by the rotary irradiation, a reference plane 6 is formed.

Further, the photodetection device 2 has a photodetection unit 7 and detects the laser beam transmitted through the photodetection unit 7.

In order to set a tilt direction, the photodetection device 2 is installed in the tilt direction and leveling is performed. Then, the reference plane 6 formed by the laser beam is greatly tilted in the normal and the reverse directions, and a direction of the main unit 4 is aligned in such a manner that a point (a cross point) which does not move at the time of tilting is aimed at the direction of the photodetection device 2.

A line, which connects a rotation center of the rotator 3 with the cross point of the reference planes 6 and 6', serves as a tilt central line (a trunnion 8 of a tilted plane). Therefore, a direction orthogonal to the trunnion 8 becomes the tilt direction.

When the main unit 4 is rotated 90° by the main unit rotator 5, the main unit 4 is adequately directed to the tilt direction.

When a tilt angle is set in this state, a desired tilted reference plane can be set.

According to the conventional method described above, the rotary laser irradiating system 1 requires the rotator 3 and an angle detector to detect a direction of the main unit 4, and a manufacturing cost of the rotary laser irradiating system 1 increases.

Furthermore, accurately detecting the cross point by using the photodetection device 2 is a very difficult operation, and a long time is required, an operation efficiency is poor, and a burden on an operator is heavy.

Moreover, as disclosed in JP-A-H9-257478 (1997) (Patent Document 1), there is a system having a configuration that the photodetection device 2 reflects the laser beam, the rotary laser irradiating system 1 detects a reflection light and detects a direction of the photodetection device 2 toward the rotary laser irradiating system 1, and the rotary laser irradiating system 1 is arranged to aim at the direction of the photodetection device 2.

However, the system disclosed in Patent Document 1 requires a function of detecting the reflection light from the photodetection device 2, a function of detecting a direction of the rotary laser irradiating system 1 at the time of detection, and a function of setting the direction of the rotary laser irradiating system 1 to the photodetection device 2, and it likewise has a problem of increasing a manufacturing cost of the rotary laser irradiation system 1.

To solve the problem as described above, the present invention can utilize an inexpensive rotary laser irradiating system having a simple configuration to enable easily setting a tilt direction and also enable easily setting a tilted reference plane.

PRIOR ART REFERENCES

Patent Document 1: JP-A-H9-257478
Patent Document 2: JP-A-H11-257960

DISCLOSURE OF THE INVENTION

The present invention relates to a rotary laser irradiating system, comprising a light emitting unit for emitting a laser beam, a rotator for forming a reference plane by projecting the laser beam by rotary irradiation, a tilt driving unit for tilting the reference plane, a control unit for controlling a light emission of the light emitting unit, and a tilted axis indicating means for turning off the laser beam so as to form a tilted reference axis indicating range in a tilt setting reference axis direction for setting a tilt.

Further, the present invention relates to the rotary laser irradiating system comprising an angle detector for detecting a rotational position of the rotator, wherein the control unit controls the light emitting unit based on a detection result from the angle detector and turns off the laser beam so as to form the tilted reference axis indicating range.

Further, the present invention relates to the rotary laser irradiating system, wherein the control unit controls the light emitting unit so as to turn off the laser beam in the tilted reference axis indicating range.

Further, the present invention relates to the rotary laser irradiating system, wherein the control unit controls the light emitting unit so as to turn off the laser beam in front of and behind the tilted reference axis indicating range.

Further, the present invention relates to the rotary laser irradiating system, wherein the tilt setting reference axis direction is a tilt direction or a direction orthogonal to the tilt direction.

Further, the present invention relates to the rotary laser irradiating system, wherein the tilt driving unit has a first tilt driving unit for tilting the rotator in a first tilt direction and a second tilt driving unit for tilting the rotator in a second tilt direction orthogonal to the first tilt direction.

Further, the present invention relates to the rotary laser irradiating system, wherein the control unit controls the light emission of the light emitting unit so as to change a direction of the tilted reference axis indicating range based on the detection result from the angle detector.

Further, the present invention relates to the rotary laser irradiating system, wherein the control unit drives the first tilt driving unit and the second tilt driving unit and tilts the reference plane in two directions, and forms a tilted reference plane having a composite tilt angle turns off the laser beam so as to form the tilted reference axis indicating range in the tilt setting reference axis direction in regard to the tilted reference plane.

Further, the present invention relates to the rotary laser irradiating system, wherein the control unit calculates a driving amount of the first tilt driving unit and a driving amount of the second tilt driving unit based on a tilt setting reference axis set to a desired direction and on a tilt angle set in regard to the tilt setting reference axis and controls the first tilt driving unit and the second tilt driving unit based on calculation results to form a composite tilted reference plane.

Further, the present invention relates to the rotary laser irradiating system, wherein the control unit drives the first tilt driving unit and the second tilt driving unit, changes a gradient direction of the reference plane, calculates a temporary tilt setting reference axis based on a driving amount of the first tilt driving unit and on a driving amount of the second tilt driving unit, and turns off the laser beam so as to form the tilted reference axis indicating range in a direction of the temporary tilt setting reference axis.

Further, the present invention relates to a rotary laser system, comprising a rotary laser irradiating system and a photodetection device, wherein the rotary laser irradiating system comprises a light emitting unit for emitting a laser beam, a rotator for forming a reference plane by projecting the laser beam by rotary irradiation, a tilt driving unit for tilting the reference plane, a control unit for controlling a light emission of the light emitting unit, and a tilted axis indicating means for turning off the laser beam so as to form a tilted reference axis indicating range in a tilt setting reference axis direction for setting a tilt and wherein the photodetection device is installed in a tilt direction or a direction orthogonal to the tilt direction and detects the laser beam from the rotary laser irradiating system.

Further, the present invention relates to the rotary laser system, wherein the rotary laser irradiating system comprises an angle detector for detecting a rotational position of the rotator, and the control unit controls the light emitting unit based on a detection result from the angle detector and turns off the laser beam to form a tilted reference axis indicating range.

Further, the present invention relates to the rotary laser system comprising an angle detector for detecting a rotational position of the rotator, wherein the tilt driving unit comprises a first tilt driving unit for tilting the rotator in a first tilt direction and a second tilt driving unit for tilting the rotator in a direction orthogonal to the first tilt direction, and wherein the control unit has a temporary tilt setting reference axis in an arbitrary direction, controls the light emitting unit based on a detection result from the angle detector, turns off the laser beam so as to form the tilted reference axis indicating range including the temporary tilt setting reference axis, and can change a direction of the tilted reference axis indicating range to an installing position of the photodetection device, and wherein the control unit sets a tilt angle based on the temporary tilt setting reference axis after changing the tilted reference axis indicating range.

Further, the present invention relates to the rotary laser system, wherein the photodetection device comprises a photodetection sensor and a detection notifying unit, and the detection notifying unit emits a notifying sign when the photodetection sensor detects the tilted reference axis indicating range.

Further, the present invention relates to the rotary laser system, wherein the rotary laser irradiating system has a first communication unit, the photodetection device has a photodetection sensor and a second communication unit, and a signal indicative of detection of the tilted reference axis indicating range by the photodetection sensor is transmitted to the first communication unit through the second communication unit.

Furthermore, the present invention relates to the rotary laser system, wherein the photodetection device comprises a photodetection device operation unit, and the rotary laser irradiating system is remotely operable by using the photodetection device operation unit.

LEGEND OF REFERENCE NUMERALS

Figure 1:
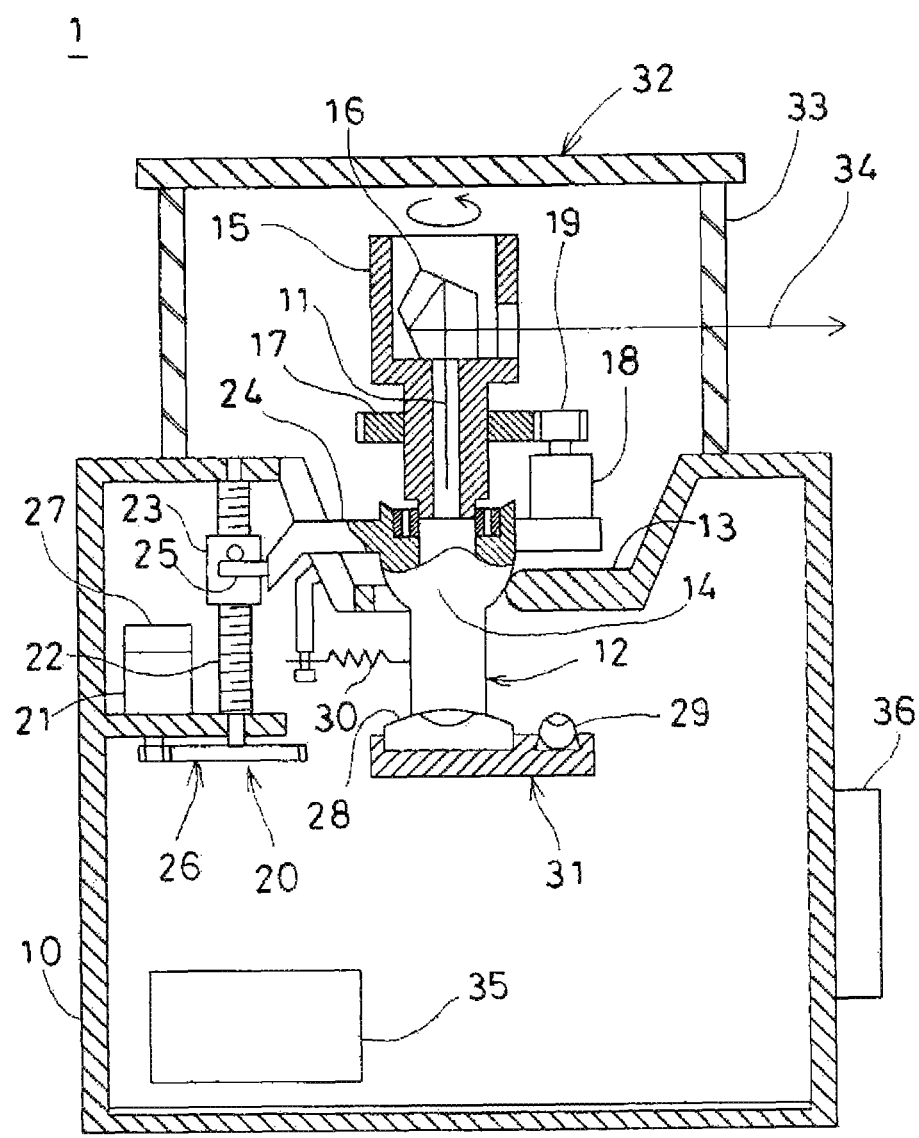
FIG. 1 is a sectional elevational view of a rotary laser irradiating system used in a first embodiment according to the present invention.

1 Rotary laser irradiating system
11 Projection light optical axis
12 Laser projector
15 Rotator
18 Scanning motor
20 Tilting mechanism
21 Tilting motor
24 Tilting arm
28 Tilting sensor
29 Tilting sensor
31 Tilt detector
34 Laser beam
35 Control unit 36 Operation unit
39 Tilting motor driving unit
41 Light emitting element
42 Light-emitting driving unit
44 Reference position detecting sensor
46 Photodetection device
47 Photodetection sensor
48 Control unit
49 Detection notifying unit
51 Trunnion indicating range
53 Continuous light emitting range
55 Encoder
56 First communication unit
59 Second communication unit
61 Photodetection device operation unit

BEST MODE FOR CARRYING OUT THE INVENTION

Referring to the drawings, preferred embodiments according to the present invention will now be described hereinafter.

Referring to FIG. 1 to FIG. 6, a first embodiment according to the present invention will be explained.

FIG. 1 shows a rotary laser irradiating system 1 used in the first embodiment. The rotary laser irradiating system 1 will now be described hereinafter.

The rotary laser irradiating system 1 includes a casing 10 and a laser projector 12 having a projection light optical axis 11 (to be described later), and the laser projector 12 is tiltably (in a direction parallel to at least a page space) in the casing 10. Although not shown, the rotary laser irradiating system 1 includes a leveling unit to install horizontally the rotary laser irradiating system 1.

A recess 13 having an inverted truncated conical shape is formed at a center of an upper surface of the casing 10, and the laser projector 12 penetrates through a center of the recess 13 in a vertical direction. The laser projector 12 is supported by the recess 13 through a spherical seat 14 in order to enable the laser projector 12 to tilt. A rotator 15 is rotatably mounted above the laser projector 12, and a deflection member, e.g., a pentagonal prism 16 is mounted on the rotator 15.

A scanning gear 17 is mounted to the rotator 15, a scanning motor 18 is mounted on the laser projector 12, a driving gear 19 is mounted to an output shaft of the scanning motor 18, the driving gear 19 engages with the scanning gear 17, and the rotator 15 is rotated and driven by the scanning motor 18 through the driving gear 19 and the scanning gear 17.

A tilting mechanism 20 is accommodated in the casing 10, and the tilting mechanism 20 has a tilting motor 21, a tilting screw 22 with a rotational center in a direction parallel to the laser projector 12, and a tilting nut 23 into which the tilting screw 22 is screwed.

The laser projector 12 has a tilting arm 24 extending in a direction (a direction parallel to a page space of the drawing) orthogonal to the projection light optical axis 11, a pin 25 with a circular cross section is provided to protrude at an end of the tilting arm 24, and the tilting arm 24 engages with the tilting mechanism 20 through the pin 25. The laser projector 12 has a hollow structure, the laser projector 12 includes a light emitting element (not shown) that emits a laser beam 34 and a projection optical system (not shown) that emits the laser beam 34 emitted from the light emitting element onto the projection light optical axis 11, and the emitted laser beam 34 is deflected in the horizontal direction by the pentagonal prism 16.

The tilting motor 21 can rotate the tilting screw 22 through a gear train 26. The tilting nut 23 moves up and down by the rotation of the tilting screw 22, and the tilting arm 24 tilts via the pin 25 according to the upward and downward movements of the tilting nut 23, thereby tilting the laser projector 12. Further, an encoder 27 is mounted to the tilting motor 21 so as to detect a rotation amount of the tilting motor 21. Furthermore, a stepping motor may be adopted as the tilting motor 21, and the encoder 27 may be omitted. In the following description, the tilting motor 21 will be explained as the stepping motor.

Reference numeral 30 in FIG. 1 denotes a spring that maintains an engaged state between the pin 25 and the tilting mechanism 20.

Tilting sensors 28 and 29 are mounted within a plane vertical to a central axis of the laser projector 12, i.e., the projection light optical axis 11, and the one tilting sensor 28 is parallel to the tilting arm 24, while the other tilting sensor 29 is orthogonal to the tilting arm 24. The tilting sensor 28 and the tilting sensor 29 form a tilt detector 31.

The tilting sensor 28 and the tilting sensor 29 can detect a tilt angle of the laser projector 12 in an arbitrary direction, the laser projector 12 can be tilted by the tilting mechanism 20 through the tilting arm 24 based on a detection result of the tilting sensor 28, and the laser projector 12 can be set vertically or tilted at a predetermined tilt angle. Moreover, the tilt setting can be achieved by driving the tilting motor 21 at an angle obtained by the conversion into the number of pulses for driving the tilting motor 21.

A rotator cover 32 is liquid-tightly mounted to an upper surface of the casing 10, and the rotator cover 32 accommodates the rotator 15. Additionally, the rotator cover 32 has a transparent cylindrical laser beam transmission window 33 so that the laser beam 34 deflected by the pentagonal prism 16 can be transmitted through the laser beam transmission window 33 and can be projected.

In the casing 10, a control unit 35 is installed and the control unit 35 controls the light emission of the light emitting element, controls the rotation of the scanning motor 18 at a constant speed, and controls the tilting motor 21 to be driven with a set driving amount (an amount obtained by converting a set angle into a rotation amount). Further, an operation unit 36 is provided outside the casing 10, and the start/stop of measurement or the setting of a tilt angle of a reference plane can be performed by using the operation unit 36.

Figure 2:
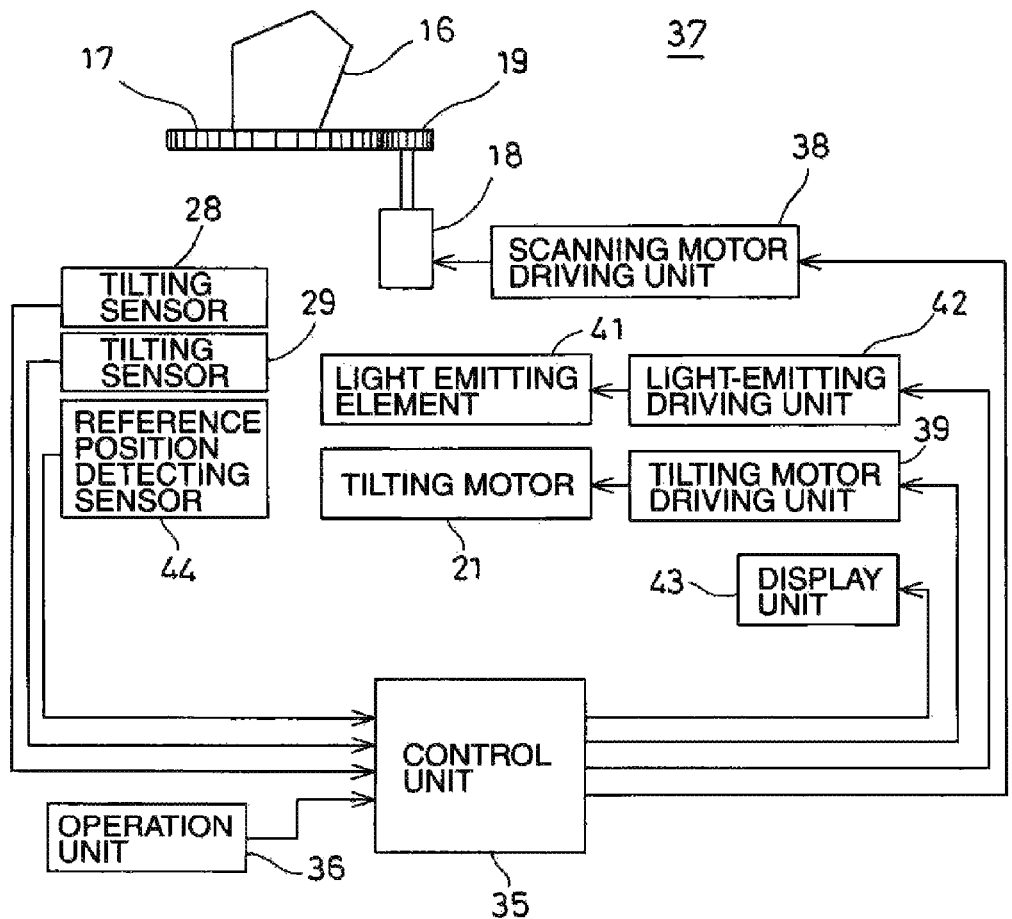
FIG. 2 is a control systematic diagram of the rotary laser irradiating system used in the first embodiment.

Referring to FIG. 2, a control system 37 including the control unit 35 will now be briefly described.

The scanning motor 18 is controlled to be driven through a scanning motor driving unit 38, the tilting motor 21 is controlled to be driven through a tilting motor driving unit 39, and a light emitting element 41 is controlled to emit the laser beam 34 through a light-emitting driving unit 42. Here, the light emitting element 41 and the light-emitting driving unit 42 constitute a light emitting unit.

Furthermore, detection results from the tilting sensors 28 and 29 are input to the control unit 35, instruction signals indicative of the start of measurement and the end of measurement and a setting signal for a tilt angle are input to the control unit 35 from the operation unit 36. Moreover, an operational status of the rotary laser irradiating system 1, a set tilt angle, and others are displayed in a display unit 43. The display unit 43 may be provided to the operation unit 36 or may be additionally provided to the casing 10.

Additionally, a reference position detecting sensor 44 for detecting a rotation reference position of the rotator 15 is provided. The reference position detecting sensor 44 may be a proximity sensor provided between a rotation unit, e.g., the scanning gear 17 and the casing 10 or may be a photosensor provided on an optical path or a branched optical path of the laser beam 34, or the reference position detecting sensor 44 may be configured to acquire a rotation reference position by an arithmetic operation based on driving pulses of the tilting motor 21. A rotational position detected by the reference position detecting sensor 44 is a position of trunnion to be described later or a position associated with the position of the trunnion.

The control unit 35 drives and emits the light emitting element 41 through the light-emitting driving unit 42, also drives the scanning motor 18 via the scanning motor driving unit 38, and projects the laser beam 34 by rotary irradiation via the pentagonal prism 16. The reference plane is formed by the rotary irradiation of the laser beam 34.

Further, the control unit 35 drives the tilting motor 21 through the tilting motor driving unit 39. By driving the tilting motor 21, the tilting screw 22 is rotated, the tilting arm 24 is tilted through the tilting nut 23, and the laser projector 12 is tilted integrally with the tilting arm 24. An emitting direction of the laser beam 34 tilts with respect to a horizontality according to the tilt of the laser projector 12, and the reference plane tilts around a tilt central line (the trunnion) as a center. In this embodiment, the trunnion serves as a central line that runs through a center of a spherical surface of the spherical seat 14 and is orthogonal to the tilting arm 24 (a central line that runs through the center of the spherical surface of the spherical seat 14 and is vertical to the page space of the drawing).

Based on a photodetection signal from the reference position detecting sensor 44, the control unit 35 controls the light emission of the light emitting element 41 so as to turn on a light in a predetermined range (a trunnion indicating range 51) (see FIG. 4) around the trunnion as a center and form turning-off ranges 52, 52 where the laser beam 34 is turned off on both sides sandwiching the trunnion indicating range 51. The control unit 35, the reference position detecting sensor 44, and others form trunnion indicating means. The trunnion indicating range 51 may be provided at one position as shown in the drawing, or may be provided at two symmetrical positions.

Figure 3:
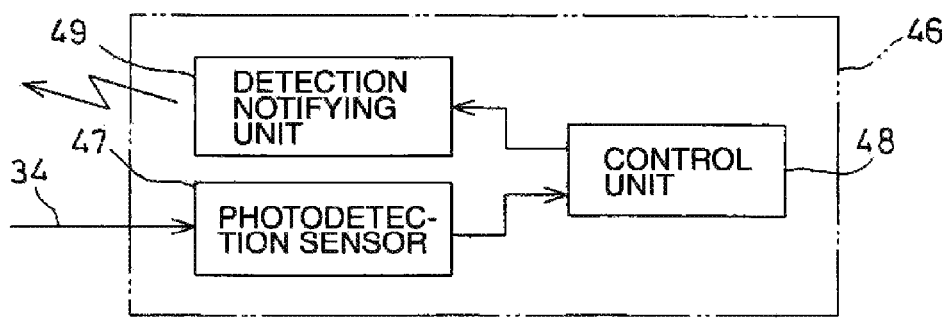
FIG. 3 is a schematic block diagram of a photodetection device used in the first embodiment.

FIG. 3 shows an example of a photodetection device 46 used in this rotary laser system.

The photodetection device 46 comprises a photodetection sensor 47, a control unit 48, and a detection notifying unit 49. The photodetection sensor 47 receives and detects the laser beam 34 from the rotary laser indicating system 1 and outputs a detection signal to the control unit 48, the control unit 48 drives the detection notifying unit 49 based on the detection signal. The detection notifying unit 49 produces a notifying sign, e.g., a light or a sound or both the light and the sound in response to a driving signal from the control unit 48.

The control unit 48 is configured to output continuously the driving signal for a predetermined time, e.g., one rotation period or more of the laser beam 34 when the detection signal is input from the photodetection sensor 47. Alternatively, the detection notifying unit 49 is configured to output continuously the notifying sign for a predetermined time, e.g., one rotation period or more of the laser beam 34 when the driving signal is received from the control unit 48. When the number of revolutions for which the laser beam 34 performs the scanning is set to a predetermined number of revolutions (e.g., 25 revolutions/second) or above, a scan trajectory of the laser beam 34 is visually recognized as a continuous light beam, and hence the notifying sign may be blinked in accordance with the detection of the laser beam 34 by the photodetection sensor 47.

Figure 4:
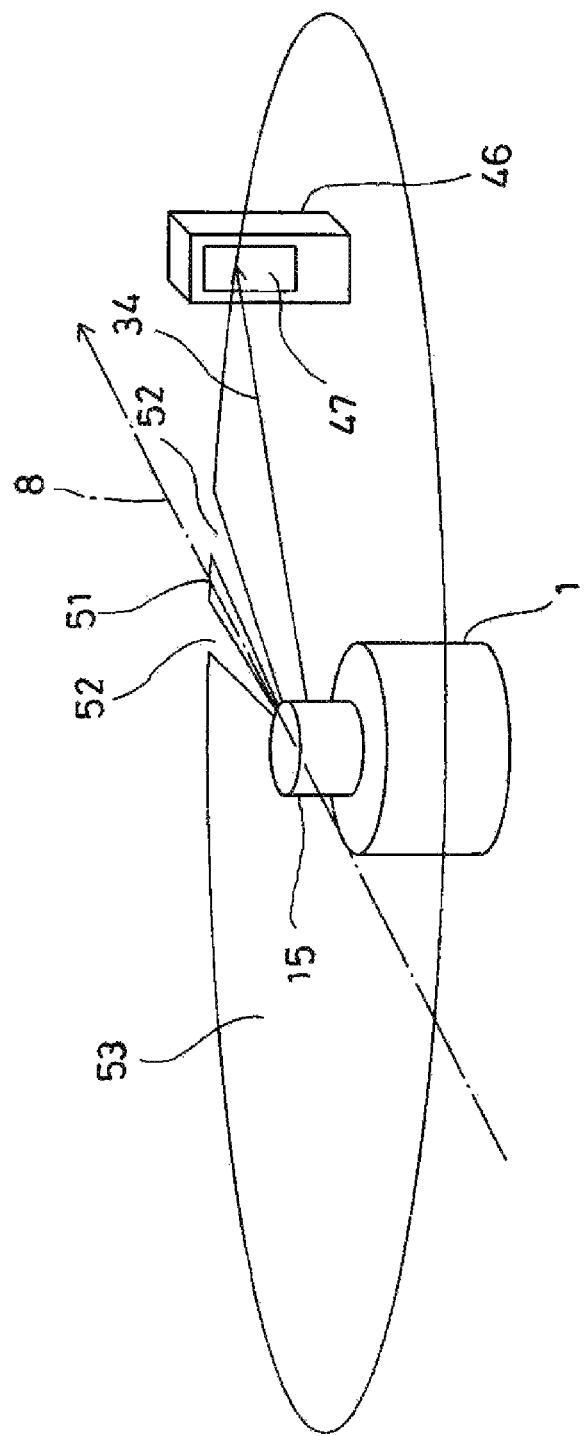
FIG. 4 is an explanatory view for explaining an operation of the first embodiment.
Figure 5:
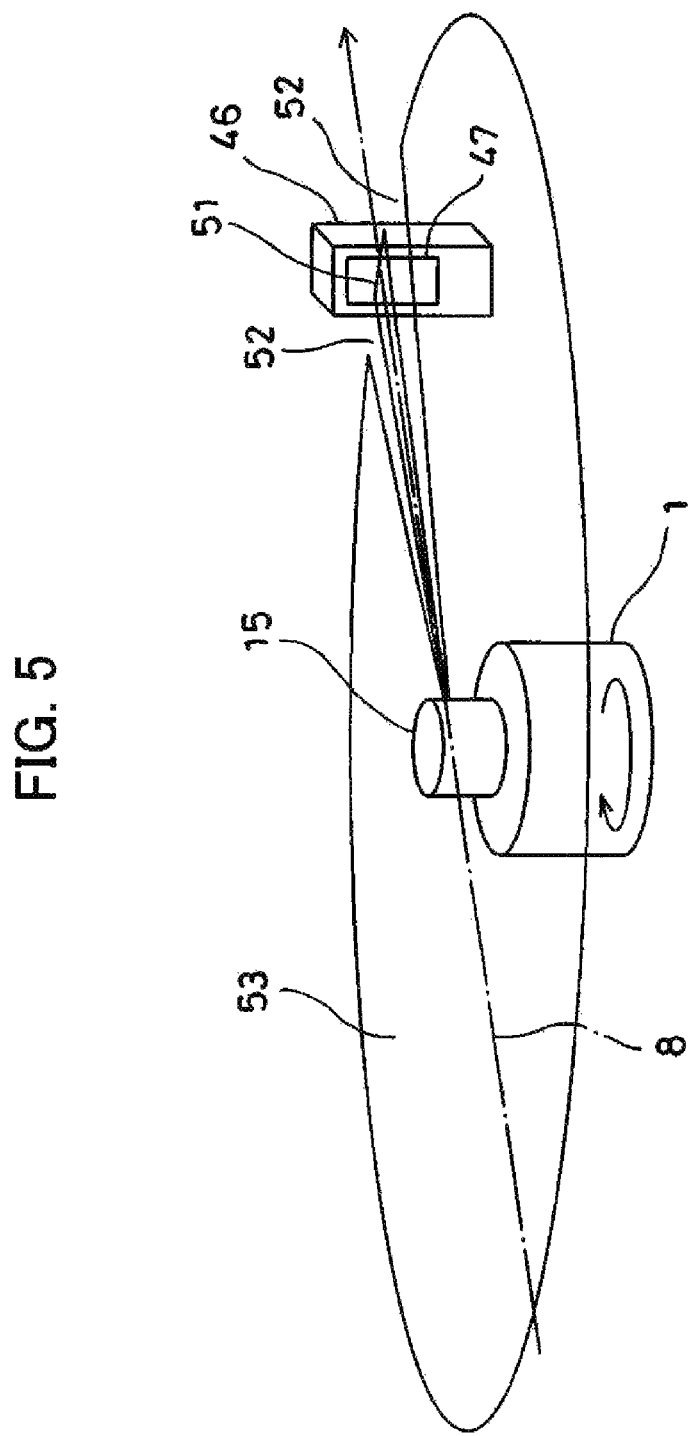
FIG. 5 is an explanatory view for explaining the operation of the first embodiment and showing a state that a trunnion aligns with a direction of the photodetection device.
Figure 6:
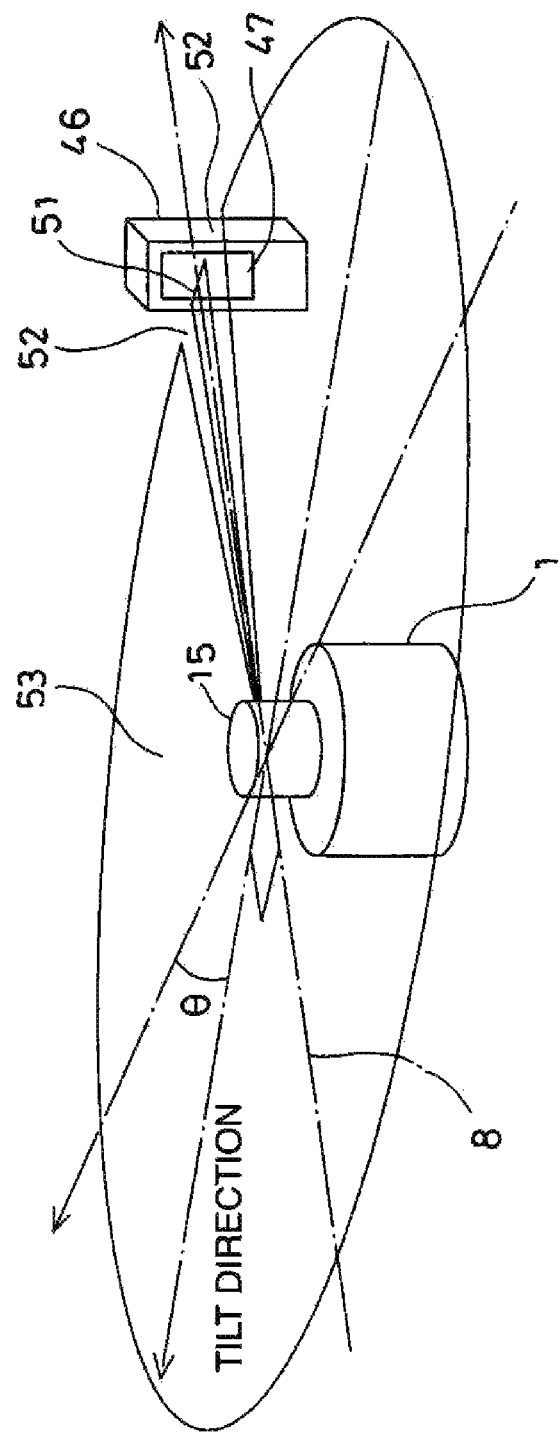
FIG. 6 is an explanatory view for explaining the operation of the first embodiment and showing a state that a tilt angle is set with the trunnion aligning with the direction of the photodetection device.
Figure 7:
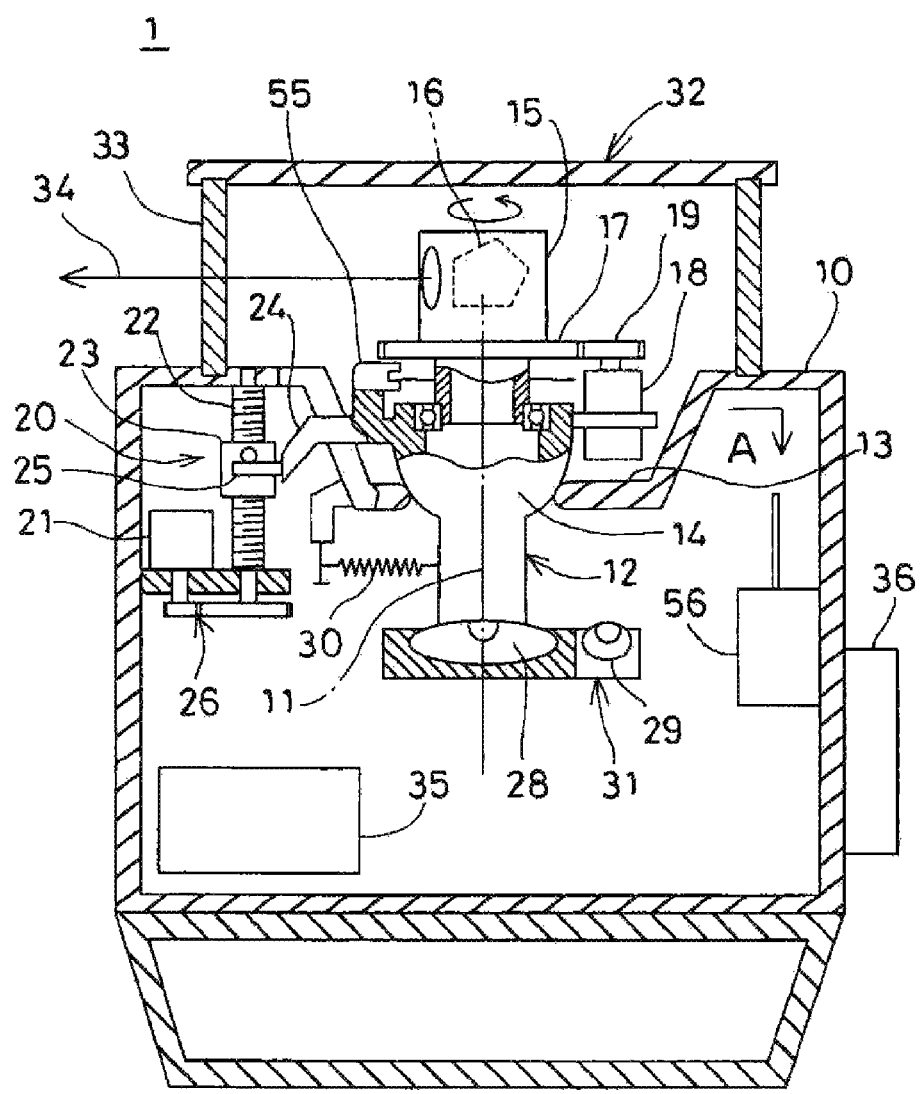
FIG. 7 is a sectional elevational view of a rotary laser irradiating system used in a second embodiment according to the present invention.

Referring to FIG. 4 to FIG. 6, an operation of the first embodiment will now be described.

The rotary laser irradiating system 1 is installed at a reference position (or a known point) and leveling is performed. Furthermore, the photodetection device 46 is installed in a direction (a direction of the trunnion 8) orthogonal to a direction in which tilting of the photodetection device 46 is desired. In regard to the installation state, the photodetection sensor 47 is arranged to face the rotary laser irradiating system 1 and a height of the photodetection sensor 47 is adjusted to coincide with a scan height of the laser beam 34 so that the laser beam 34 projected from the rotary laser irradiating system 1 by rotary irradiation can be received.

The operation of rotary laser irradiating system 1 is started by manipulating the operation unit 36 by an operator, thereby projecting the laser beam 34 by rotary irradiation. A horizontal reference plane is formed by the rotary irradiation of the laser beam 34.

Based on a detection signal from the reference position detecting sensor 44, the control unit 35 controls the light emission of the light emitting element 41 so as to turn on the laser beam 34 in the trunnion indicating range 51 with the trunnion as a center, to turn off the laser beam 34 in the turning-off ranges 52, 52 sandwiching the trunnion indicating range 51, and to emit the light continuously in the remaining range (a continuous light emitting range 53).

When the direction of the trunnion 8 in the rotary laser irradiating system 1 does not coincide with the installing position of the photodetection device 46 (see FIG. 4), the photodetection device 46 is placed in the continuous light emitting range 53, and the laser beam 34 passes through the photodetection sensor 47 at every rotation. Therefore, the detection notifying unit 49 continuously emits the notifying sign.

As shown in FIG. 4, when the notifying sign is continuously emitted, the direction of the trunnion 8 does not coincide with the installing position of the photodetection device 46, or the photodetection device 46 is installed on the trunnion 8 and the photodetection sensor 47 detects the trunnion indicating range 51. Therefore, when the rotary laser irradiating system 1 is slightly rotated and the trunnion 8 is slightly oscillated, it can be revealed that the photodetection sensor 47 detects the trunnion indicating range 51.

The operator gradually rotates the rotary laser irradiating system 1 while confirming a notifying state of the photodetection device 46. Then, when the turning-off range 52 reaches the photodetection sensor 47, the notifying sign from the photodetection device 46 goes out. When the system is further rotated, the photodetection device 46 again emits the notifying sign. This state corresponds to a state that the trunnion indicating range 51 is detected by the photodetection sensor 47. When the rotary laser irradiating system 1 is installed in this state, a tilt direction of the reference plane is set (see FIG. 5).

In order to confirm whether the photodetection sensor 47 has detected the trunnion indicating range 51, after the reemission of the notifying sign from the photodetection device 46, when the rotary laser irradiating system 1 is further continuously rotated in the same direction, the sensor reaches the turning-off range 52 on a opposite side, and the notifying sign again goes out. When this notifying sign goes out again, it can be confirmed that the detection of the trunnion indicating range 51 is adequate.

When the rotary laser irradiating system 1 is installed so as to enable the photodetection sensor 47 to detect the trunnion indicating range 51, the installation of the rotary laser irradiating system 1 is completed.

Subsequently, when a tilt angle of the reference plane is set by the operation unit 36, the tilting motor driving unit 39 is driven for a predetermined amount by the control unit 35, and the reference plane tilts around the trunnion 8 as the center, a reference tilt plane is set at a predetermined tilt angle θ (see FIG. 6).

By using a visible light beam as the laser beam 34, the photodetection device 46 by which the reception of the laser beam 34 can be confirmed is satisfactory and, for example, the photodetection device 46 may be a white plate or a diffusion plate that simply has a high reflectivity. Moreover, in the above embodiment, although the turning-off ranges 52, 52 are formed on either side of the trunnion indicating range 51, the laser beam may be turned off in the trunnion indicating range 51 and the turning-off ranges 52, 52 may be omitted. In this case, in order to facilitate the confirmation of the operator, when the photodetection sensor 47 is placed in the trunnion indicating range 51, i.e., in a state that the laser beam 34 is not received, the notifying sign from the detection notifying unit 49 may be blinked.

Additionally, as the trunnion indicating means for forming the trunnion indicating range 51, a masking may be attached to the laser beam transmission window 33 so that the trunnion indicating range 51 can be further easily formed. The masking locally blocks the laser beam 34 projected by the rotary irradiation and exercises an effect which is equivalent to an effect of turning off partially, thereby forming the trunnion indicating range 51.

Further, in the above embodiment, although the notifying sign is emitted in the direction of the trunnion 8, the notifying sign may be emitted in a direction of an axis orthogonal to the trunnion 8, i.e., the tilt direction. In this case, the photodetection device 46 is disposed in the tilt direction. Likewise, the masking may be attached in a direction orthogonal to the trunnion 8, i.e., a direction orthogonal to a central axis of the tilting arm 24. That is, the trunnion 8 and a central axis orthogonal to the trunnion 8 are tilt setting reference axes in case of setting a tilt angle, and it is suffice that a tilted reference axis indicating means is provided in not only the direction of the trunnion 8 but also the direction orthogonal to the trunnion 8 so as to enable the notifying sign to be emitted.

According to this embodiment, a direction of the system can be confirmed by the simple configuration, and a tilting motor for setting a tilting can be provided in one direction alone. Furthermore, an operation procedure can be simplified, thereby considerably reducing a time for setting a tilt direction.

A rotation device may be provided to rotate the rotary laser irradiating system 1 around a vertical central axis, and a direction of the rotary laser irradiating device 1 may be changed by the rotation device.

Referring to FIG. 7 to FIG. 10, a second embodiment will now be described. In FIG. 7 to FIG. 10, same components as shown in FIG. 1 to FIG. 6 are referred by the same symbol, and detailed description is not given here.

In a rotary laser irradiating system 1 according to the second embodiment, the tilt of a reference plane can be set to two directions, and a tilted reference plane with a composite tilt angle can be set.

Figure 8:
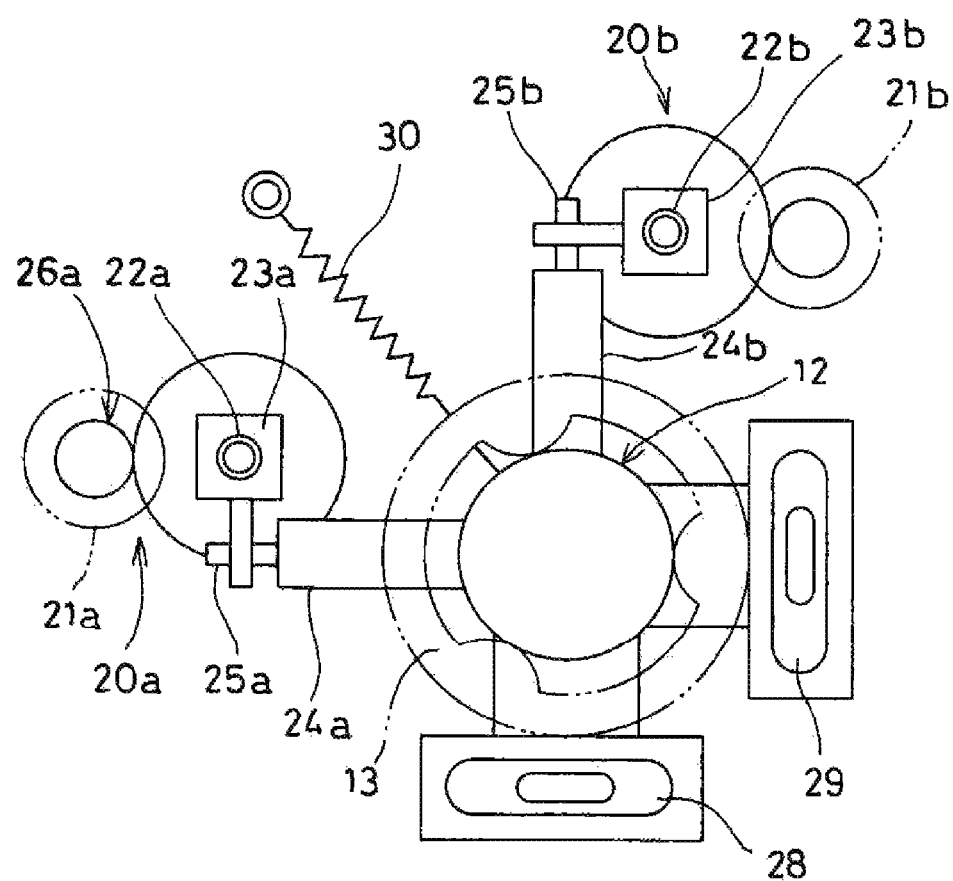
FIG. 8 is arrow diagram taken through A as indicated by an arrowhead in FIG. 7.

As shown in FIG. 8, like the tilting mechanism 20 according to the first embodiment, a first tilting mechanism 20a is mounted. "a" as a suffix is added to each element constituting the first tilting mechanism 20a.

A second tilting mechanism 20b is mounted at a position of 90° from the first tilting mechanism 20a. The second tilting mechanism 20b will now be described hereinafter. "b" as a suffix is added to each element constituting the second tilting mechanism 20b.

A tilting arm 24b extending in a direction (a direction vertical to a page space of FIG. 7 which is also a direction protruding to a back side of the page space) orthogonal to a tilting arm 24a is provided. The second tilting mechanism 20b engages with the tilting arm 24b through a pin 25b.

The second tilting mechanism 20b and the first tilting mechanism 20a have the same configuration, therefore a detailed description of the configuration is omitted.

Further, a laser projector 12 is tilted by using each of the first tilting mechanism 20a and the second tilting mechanism 20b and, in regard to tilt directions in this example, a direction along which the first tilting mechanism 20a tilts is equal to a tilt direction detected by the tilting sensor 28, and a direction along which the second tilting mechanism 20b tilts is equal to a tilt direction detected by the tilting sensor 29 (see FIG. 8).

An angle detector to detect a direction (a rotational position) of a rotator 15, i.e., a direction in which a laser beam 34 is emitted, is provided. An encoder 55 is utilized as the angle detector, and the encoder 55 is provided between the rotator 15 and the laser projector 12. As the encoder 55, it is preferable to use an absolute encoder that can detect an absolute angle of a rotational angle or an incremental encoder that has a zero position detecting function and can detect an angle from a zero position.

Here, as a position of an angle 0 detected by the encoder 55, a direction of a central axis of the tilting arm 24a or the tilting arm 24b is preferable. Alternatively, a position of the angle 0 may be determined as a known angle with respect to the direction of the central axis of the tilting arm 24a or the tilting arm 24b.

Furthermore, another example of the angle detector may be capable of detecting a rotational speed of the rotator 15 and a reference point (the zero position), may detect a time elapsed from the zero position detection, and may acquire an angle based on the detected time and the rotational speed.

A first communication unit 56 is mounted in a casing 10 and capable of mutually communicating with a photodetection device 46.

Figure 9:
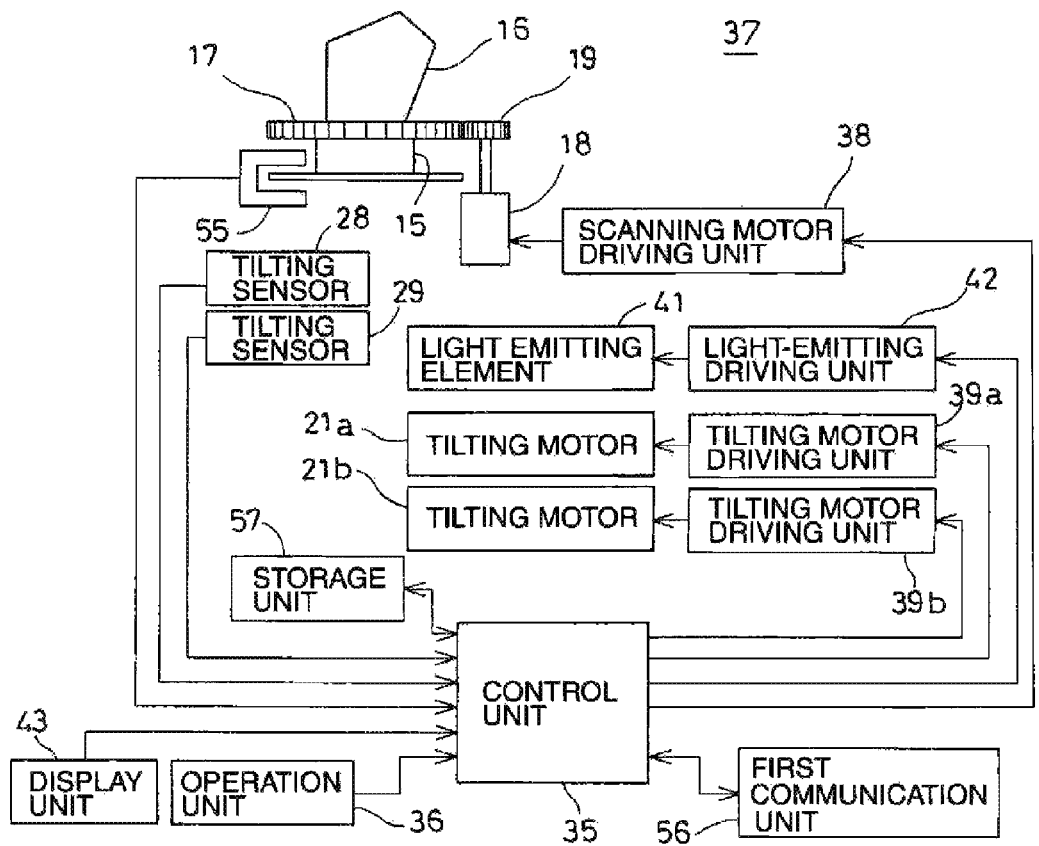
FIG. 9 is a control systematic view of the rotary laser irradiating system used in the second embodiment.

Referring to FIG. 9, a control system 37 in the second embodiment will now be described. In FIG. 9, same components as shown in FIG. 2 are referred by the same symbol, and detailed description is not given here.

In FIG. 9, reference numeral 57 denotes a storage unit, and various kinds of storage devices such as a semiconductor memory, an HDD, a memory card, and others are used as the storage unit 57. Reference numeral 56 designates the first communication unit, and the first communication unit 56 carries out a wireless communication with the photodetection device 46.

The storage unit 57 stores programs required for driving the rotary laser irradiating system 1. As the programs, there are a sequence program, a light emission control program to control the light emission of a light emitting element 41 by a light-emitting driving unit 42, a tilt angle setting program to control the driving of the tilting motor driving units 39a and 39b so that a composite tilted reference plane can be set by setting tilt angles in two directions, further, to analyze and calculate the composite angle into tilt angles in two directions, by setting an arbitrary tilt angle (a composite angle) in an arbitrary direction, and to drive the tilting motor driving units 39a and 39b, further, a mode selection program to select and execute a manual mode in which a tilt angle is manually set and an auto mode in which the tilt angle is automatically set, a communication program to achieve wireless communication with the photodetection device 46, and other programs.

Figure 10:
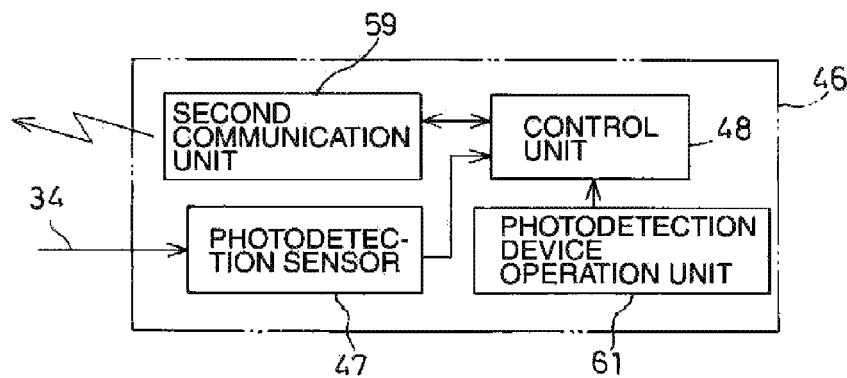
FIG. 10 is a schematic block diagram of a photodetection device used in the second embodiment.

FIG. 10 shows the photodetection device 46 in the second embodiment.

The photodetection device 46 has a photodetection sensor 47 to detect the reception of the laser beam 34, a second communication unit 59 to wirelessly communicate with the first communication unit 56 of the rotary laser irradiating system 1, a control unit 48 to control the communication of the second communication unit 59 based on a laser beam detection signal from the photodetection sensor 47, and a photodetection device operation unit 61 capable of remotely operating the rotary laser irradiating system 1.

The photodetection sensor 47, the photodetection device operation unit 61, the first communication unit 56, and others constitute a photodetection device detecting means.

Figure 11:
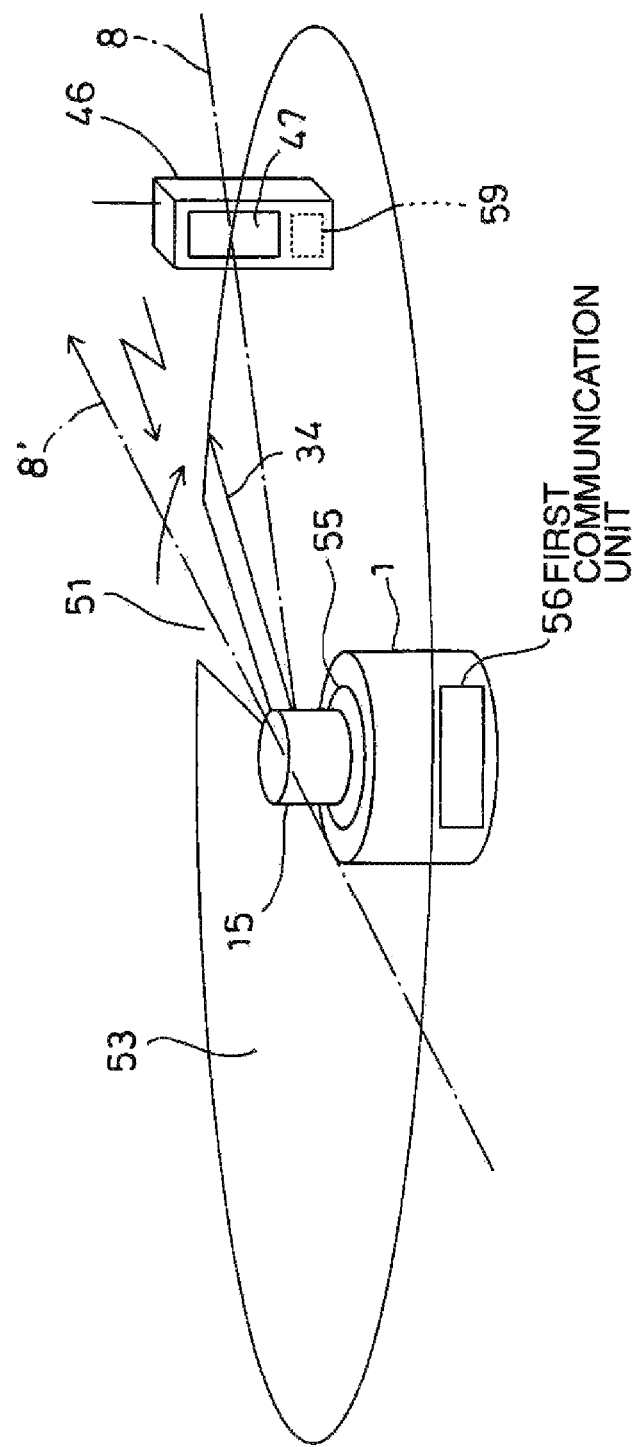
FIG. 11 is an explanatory view for explaining an operation of the second embodiment.
Figure 12:
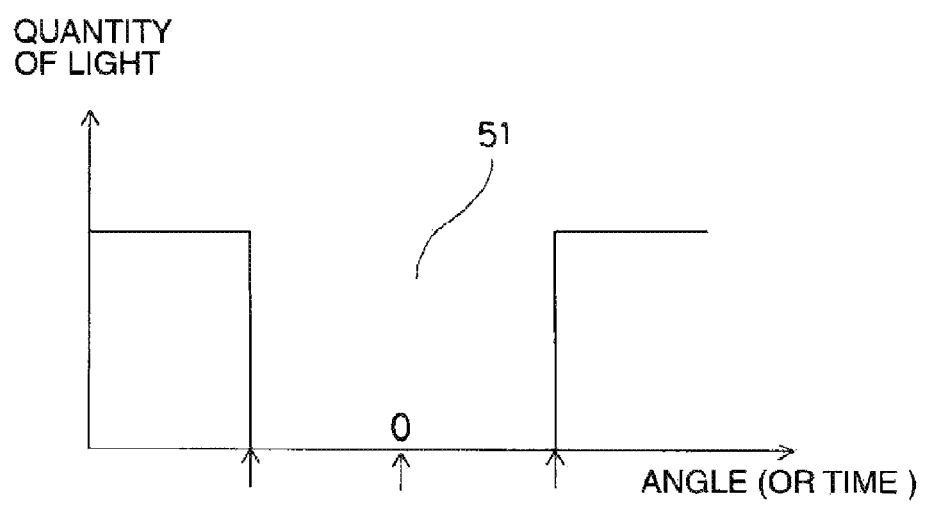
FIG. 12 is a view showing a photodetection signal of the photodetection device.
Figure 13:
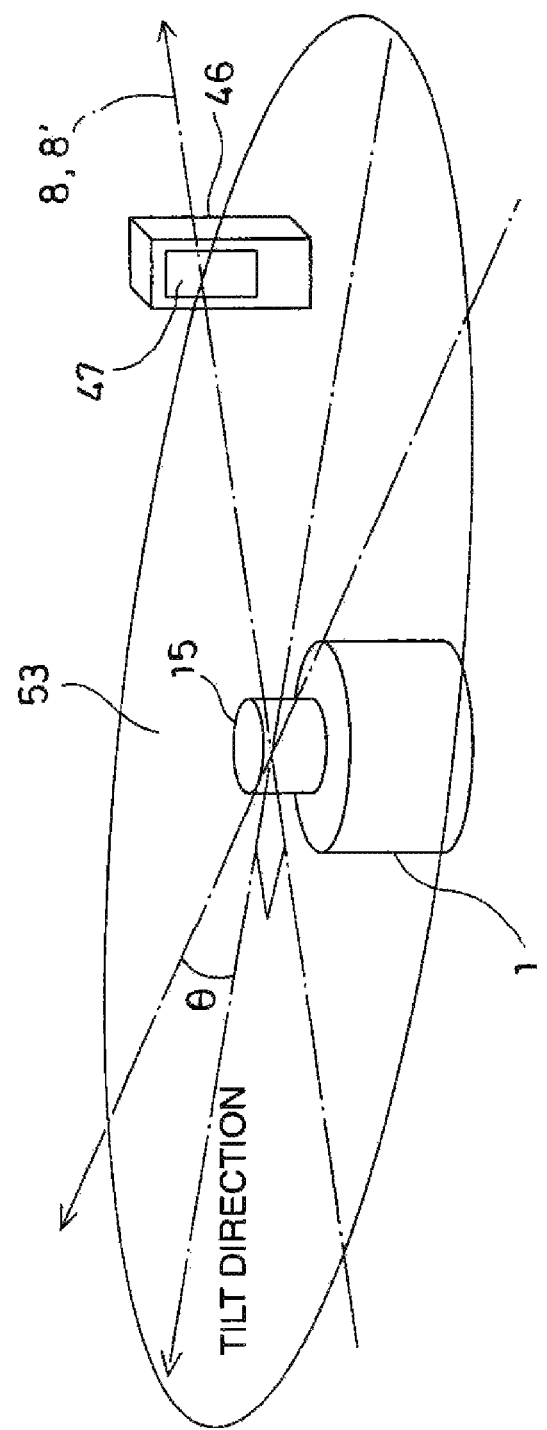
FIG. 13 is an explanatory view for explaining the operation of the second embodiment and showing a state that a tilt angle is set with a trunnion aligning with a direction of the photodetection device.

Referring to FIG. 11 to FIG. 13, an operation of the second embodiment will now be described hereinafter.

The rotary laser irradiating system 1 is installed and leveled at a reference position (or a known point). A machine reference direction (e.g., the central axis direction of the tilting arm 24a or the tilting arm 24b) of the rotary laser irradiating device 1 is preferably set to a known azimuth angle.

The photodetection device 46 is installed in a direction (a direction of a trunnion 8) orthogonal to a direction in which tilting should be effected. In regard to an installation state, the photodetection sensor 47 is arranged to face the rotary laser irradiating system 1 so as to enable receiving the laser beam 34 projected from the rotary laser irradiating system 1 by rotary irradiation, and a height of the photodetection sensor 47 is adjusted to coincide with a scan height of the laser beam 34.

The rotary laser irradiating system 1 starts to operate in response to the manipulation of the photodetection device operation unit 61 by an operator, and the laser beam 34 is projected by the rotary irradiation. A horizontal reference plane is formed by the rotary irradiation of the laser beam 34.

A light emission state of the laser beam 34 emitted from the light emitting element 41 is controlled by the control unit 35 through the light-emitting driving unit 42. As an example of the control over the light emission state, the turning-off is carried out in a trunnion indicating range 51 as shown in FIG. 11. In the second embodiment, a central line of the trunnion indicating range 51 serves as a temporary trunnion 8'. A reference direction of the temporary trunnion 8' is set as an initial setting in advance by the control unit 35. The reference direction is, e.g., the central axis direction of the tilting arm 24a or the tilting arm 24b, which is the machine reference direction.

When a setting of the trunnion 8 is performed, the rotary laser irradiating system 1 is switched to an auto alignment mode by the photodetection device operation unit 61 in advance.

When the photodetection device 46, i.e., the photodetection sensor 47 receives the laser beam 34, a photodetection signal is supplied to the control unit 48 from the photodetection sensor 47, and the control unit 48 transmits the photodetection signal to the rotary laser irradiating system 1 through the second communication unit 59. The first communication unit 56 receives the photodetection signal and inputs a reception result to the control unit 35. The control unit 35 reads an angle of the encoder 55 at the time of input. An angle detection result is called in to determine a direction (an angle) of the photodetection device 46. A time lag caused due to the wireless communication or a time lag caused due to the signal processing may be taken into consideration to reduce a rotational speed of the laser beam 34 at the time of alignment.

The control unit 35 calculates a difference between a direction (an angle) of the temporary trunnion 8' and the direction of the photodetection device 46, controls the light emission state of the light emitting element 41 through the light-emitting driving unit 42, and gradually changes the direction (a position at which the trunnion indicating range 51 is formed) of the temporary trunnion 8'.

When the temporary trunnion 8' moves and reaches a photodetection range of the photodetection sensor 47, the photodetection signal from the photodetection sensor 47 disappears. The control unit 35 judges that the photodetection signal from the photodetection device 46 has ceased, and an angle at the time of ceasing is read out from the encoder 55. A disappearing state of the photodetection signal continues during a period that the temporary trunnion 8' passes through the photodetection sensor 47. Furthermore, when the temporary trunnion 8' moves and deviates from the photodetection range of the photodetection sensor 47, the photodetection sensor 47 again receives the laser beam 34 and emits the photodetection signal. The photodetection signal is transmitted to the rotary laser irradiating system 1 through the second communication unit 59 as described above and, when this signal is received by the first communication unit 56, an angle at the time of reception is read from the encoder 55.

FIG. 12 shows a state of the photodetection signal from the photodetection sensor 47 at this moment. Respective angles at the time of the disappearing of the photodetection signal and at the time of the reemission of the photodetection signal can be read from the encoder 55. A center of a range where the photodetection signal has disappeared is the trunnion 8, and an angle of the trunnion 8, i.e., an angle of the center O of the range where the signal has disappeared can be calculated from the two angles read from the encoder 55.

An angle of the temporary trunnion 8' is clear from the control over the light emission state by the light-emitting driving unit 42, and the light-emitting driving unit 42 is controlled by the control unit 35 to move the temporary trunnion 8' in such a manner that the angle of the temporary trunnion 8' coincides with the angle of the trunnion 8.

When the temporary trunnion 8' coincides with the trunnion 8, the notifying sign is emitted from the rotary laser irradiating system 1 or the photodetection device 46, and the operator judges that the setting of the trunnion 8 has been completed. In regard to a relationship between the temporary trunnion 8' and the trunnion indicating range 51, the temporary trunnion 8' does not have to be positioned at the center of the trunnion indicating range 51. It is suffice if the temporary trunnion 8' is included in the trunnion indicating range 51 and a relationship with the trunnion indicating range 51 is known.

The operator sets a tilt angle from the photodetection device operation unit 61 or an operation unit 36. Here, the set direction of the trunnion 8, i.e., the direction of the temporary trunnion 8' has been moved in the light emission state, and hence the set direction of the trunnion 8 does not coincide with an initialized direction, i.e., a direction (the machine reference direction) of each of the tilting arms 24a and 24b. Therefore, a tilt angle to be set (a set tilt angle) is a composite tilt angle obtained by setting tilt angles by the first tilting mechanism 20a and the second tilting mechanism 20b, respectively.

When the tilt angle is set, the control unit 35 analyzes and calculates the set tilt angle to be turned to a tilt angle in the direction of the tilting arm 24a and a tilt angle in the direction of the tilting arm 24b. Based on the angle acquired from the calculation and on an angular difference between the machine reference direction and the direction of the trunnion 8, the control unit 35 calculates respective driving amounts of the tilting motor driving units 39a and 39b, drives the tilting motors 21a and 21b based on the obtained driving amounts, and sets a composite tilt angle.

Figure 14:
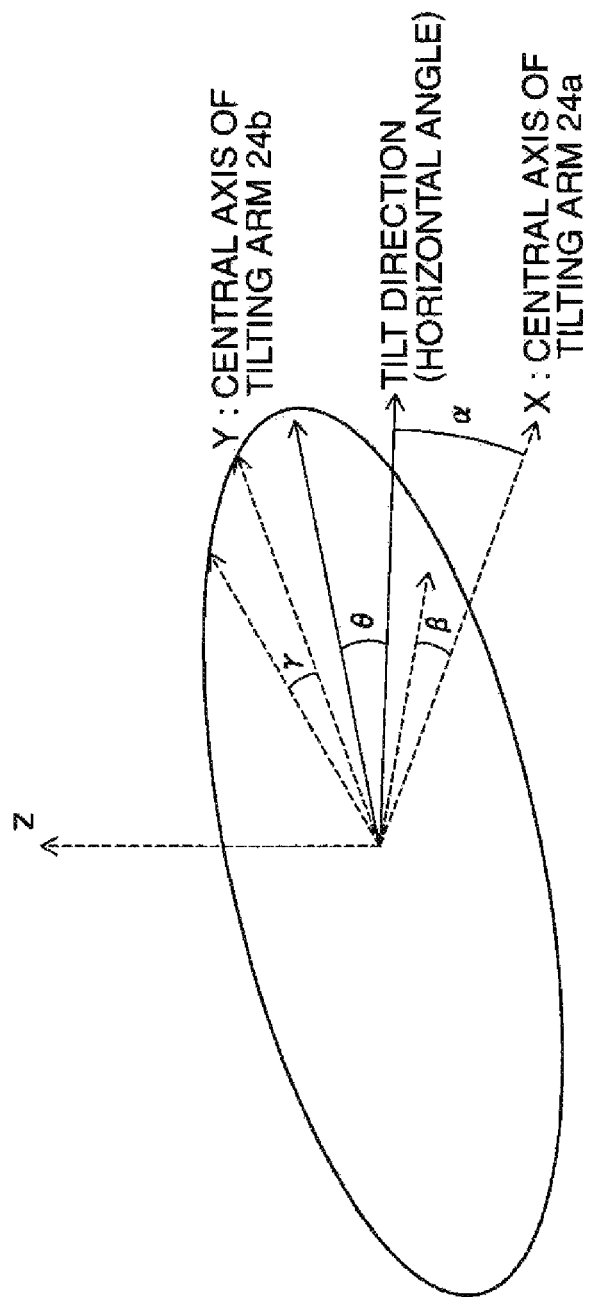
FIG. 14 is an explanatory view showing a relationship between a composite tilt angle, a tilt direction, and the tilt of a tilting arm 24a and a tilting arm 24b.
Figure 15:
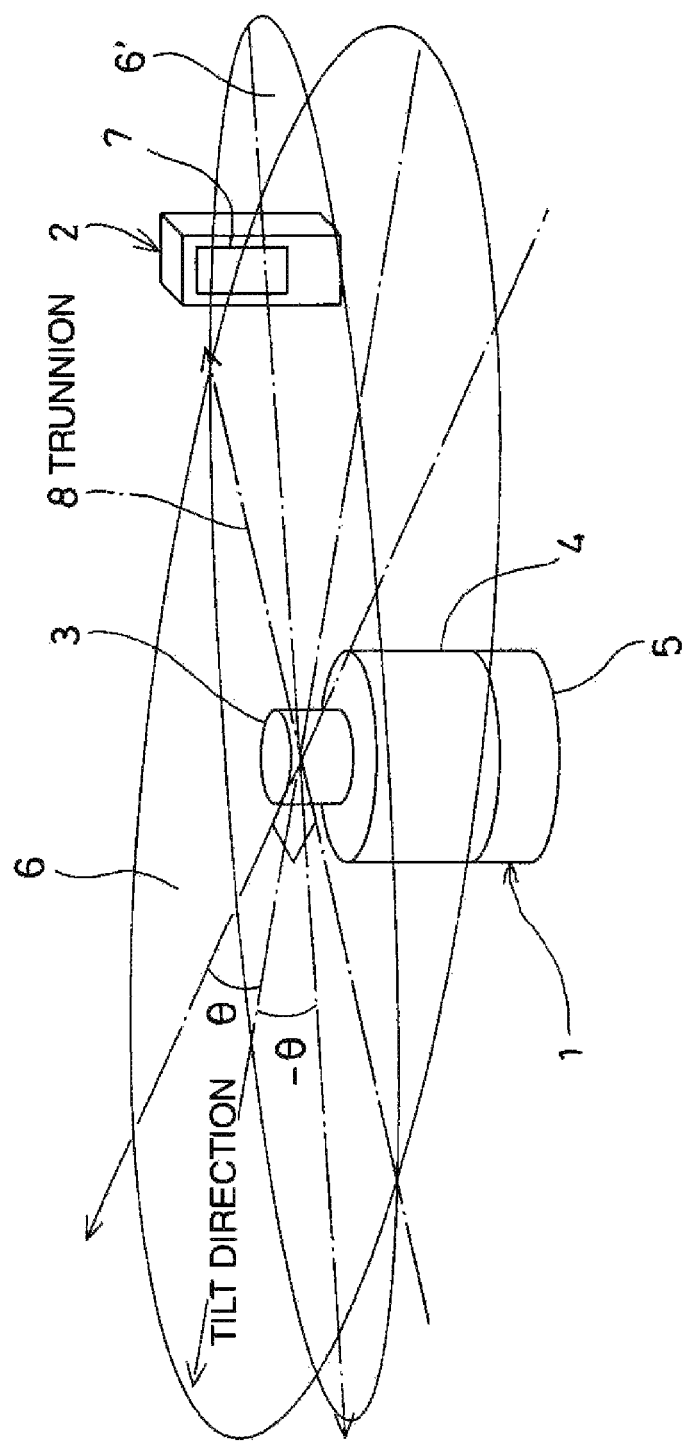
FIG. 15 is an explanatory view showing a setting of a trunnion and a setting of a composite tilt angle in a conventional example.

Next, referring to FIG. 14, a relationship between a composite tilt angle θ, a tilt direction (a horizontal angle with respect to the machine reference direction) α, a tilt angle β of the tilting arm 24a, and a tilt angle γ of the tilting arm 24b will now be described.

The composite tilt angle θ, the tilt direction angle α, and the tilt angles β and γ of the tilting arm 24a and the tilting arm 24b on a composite gradient plane have the following relationship:

$$\beta = \tan^{-1}(\cos\alpha \cdot \tan\theta)$$

$$\gamma = \tan^{-1}(-\tan\theta \cdot \cos(90° - \alpha))$$

As the photodetection device detecting means in the above embodiment, the photodetection result of the laser beam 34 obtained by the photodetection sensor 47 is transmitted by the communicating means but the photodetection device 46 may be determined as a reflection target and a photodetection sensor that detects a reflected light beam from the reflection target may be provided to the rotary laser irradiating system 1 and the photodetection device may be detected based on a photodetection signal from the photodetection sensor.

Moreover, the photodetection device operation unit 61 may be attachable to/detachable from the photodetection device 46, the photodetection device operation unit 61 may serve independently as a remote controller. The photodetection device operation unit 61 may be connected with the photodetection device 46 wirelessly or through a cable, a photodetection state of the laser beam 34 in the photodetection device 46 may be transmitted to and displayed on the photodetection device operation unit 61. The rotary laser irradiating system 1 can be remotely operated while confirming the photodetection state.

According to the present invention, to detect the trunnion 8, the rotary laser irradiating system 1 itself does not have to be rotated, the system can be simplified, the operation can be facilitated. Therefore, no error of operation occurs and an operation time can be greatly reduced.

In the second embodiment, the notifying sign may be emitted at the tilt direction. In this case, the photodetection device 46 is likewise installed in the tilt direction.

When an installation posture, i.e., a direction (an azimuth angle) of the rotary laser irradiating system 1 is already known and when a tilt direction (an aspect) to be set and a tilt angle to set are known from construction data and others in advance, a desired tilted reference angle can be set without the photodetection device 46.

When a tilt direction (an azimuth angle of the trunnion 8) and a tilt angle of the reference plane to be set are input by using the photodetection device operation unit 61, the control unit 35 calculates an angle between the machine reference direction of the rotary laser irradiating system 1 and the set trunnion 8 and calculates respective driving amounts of the tilting motors 21a and 21b based on the angle of the trunnion 8 and the tilt angle of the reference plane to be set.

A desired tilted reference plane can be obtained by driving and controlling the tilting motors 21a and 21b through the tilting motor driving units 39a and 39b based on the calculated driving amounts of the tilting motors 21a and 21b, respectively.

Another embodiment of the setting of a tilted reference plane will now be described.

The setting of a tilted reference plane is performed after setting a horizontal reference, and this situation corresponds to a case where a tilt angle and a tilt direction of a reference plane are again set with the reference plane being tilted.

A tilt direction and a tilt angle are reset from the photodetection device operation unit 61 or the operation unit 36. As to the resetting of the tilt direction, an absolute angle (an azimuth angle) may be input, or an angle with a current tilt direction as a reference may be used.

In a state that a tilted reference plane has been formed, an angle of the trunnion 8, i.e., the temporary trunnion 8' (the trunnion recognized in the rotary laser irradiating system 1) is already known, a new trunnion 8' after the resetting is calculated based on the reset tilt direction. The reset tilt angle is analyzed to a tilt angle in a tilt direction of each of the first tilting mechanism 20a and the second tilting mechanism 20b based on the new trunnion 8'. The first tilting mechanism 20a and the second tilting mechanism 20b are driven, a reference plane is set based on the reset tilt angle in the reset tilt direction, and the laser beam 34 is projected by the rotary irradiation, thereby forming the tilted reference plane after the resetting.

In the other embodiments, since the reference plane does not have to be set to the horizontal state and the photodetection device 46 does not have to be reinstalled in the direction of the trunnion 8, the resetting operation for the tilted reference plane can be very rapidly performed.

Industrial Applicability

According to the present invention, the rotary laser irradiating system comprises a light emitting unit for emitting a laser beam, a rotator for forming a reference plane by projecting the laser beam by rotary irradiation, a tilt driving unit for tilting the reference plane, a control unit for controlling a light emission of the light emitting unit, and a tilted axis indicating means for turning off the laser beam so as to form a tilted reference axis indicating range in a tilt setting reference axis direction for setting a tilt. As a result, a direction of the rotary laser irradiating system can be confirmed, the tilted reference axis indicating range of the laser beam can be easily set in regard to a direction in which tilting of this range is desired. Therefore, an operation procedure for setting a tilt direction can be simplified, and a time for setting the tilt direction can be reduced remarkably.

Further, according to the present invention, the rotary laser irradiating system comprises an angle detector for detecting a rotational position of the rotator, and the control unit controls the light emitting unit based on a detection result from the angle detector and turns off the laser beam so as to form the tilted reference axis indicating range. As a result, a direction of the formed tilted reference axis indicating range can be detected by the angle detector. Therefore, it is possible to specify the direction of the tilted reference axis indicating range formed with respect to the rotary laser irradiating system.

Further, according to the present invention, the control unit controls the light emitting unit so as to turn off the laser beam in the tilted reference axis indicating range. Further, according to the present invention, the control unit controls the light emitting unit so as to turn off the laser beam in front of and behind the tilted reference axis indicating range. As a result, by confirming a light emission state of the laser beam, it is possible to detect readily a tilted reference axis.

Further, according to the present invention, the tilt driving unit has a first tilt driving unit for tilting the rotator in a first tilt direction and a second tilt driving unit for tilting the rotator in a second tilt direction orthogonal to the first tilt direction. As a result, the reference plane can be tilted in an arbitrary direction without changing a direction of the rotary laser irradiating system.

Further, according to the present invention, the control unit controls the light emission of the light emitting unit so as to change a direction of the tilted reference axis indicating range based on the detection result from the angle detector. As a result, the tilt direction can be set to an arbitrary direction without rotating the rotary laser irradiating system.

Further, according to the present invention, the control unit drives the first tilt driving unit and the second tilt driving unit and tilts the reference plane in two directions, and forms a tilted reference plane having a composite tilt angle turns off the laser beam so as to form the tilted reference axis indicating range in the tilt setting reference axis direction in regard to the tilted reference plane. As a result, the reference plane tilted in an arbitrary direction at an arbitrary angle can be formed without changing a direction of the rotary laser irradiating system.

Further, according to the present invention, the control unit calculates a driving amount of the first tilt driving unit and a driving amount of the second tilt driving unit based on a tilt setting reference axis set to a desired direction and on a tilt angle set in regard to the tilt setting reference axis and controls the first tilt driving unit and the second tilt driving unit based on calculation results to form a composite tilted reference plane. As a result, the reference plane tilted in an arbitrary direction at an arbitrary angle can be formed without changing a direction of the rotary laser irradiating system.

Further, according to the present invention, the control unit drives the first tilt driving unit and the second tilt driving unit, changes a gradient direction of the reference plane, calculates a temporary tilt setting reference axis based on a driving amount of the first tilt driving unit and on a driving amount of the second tilt driving unit, and turns off the laser beam so as to form the tilted reference axis indicating range in a direction of the temporary tilt setting reference axis. As a result, the reference plane tilted in an arbitrary direction at an arbitrary angle can be formed without changing a direction of the rotary laser irradiating system.

Further, according to the present invention, the rotary laser system comprises a rotary laser irradiating system and a photodetection device, and the rotary laser irradiating system comprises a light emitting unit for emitting a laser beam, a rotator for forming a reference plane by projecting the laser beam by rotary irradiation, a tilt driving unit for tilting the reference plane, a control unit for controlling a light emission of the light emitting unit, and a tilted axis indicating means for turning off the laser beam so as to form a tilted reference axis indicating range in a tilt setting reference axis direction for setting a tilt and the photodetection device is installed in a tilt direction or a direction orthogonal to the tilt direction and detects the laser beam from the rotary laser irradiating system. As a result, when the photodetection device is installed at a necessary position where setting of a tilted plane is desired, the tilted reference plane can be set easily, and an operation procedure can be simplified. Therefore, a time for setting a tilt direction can be reduced remarkably.

Further, according to the present invention, the rotary laser irradiating system comprises an angle detector for detecting a rotational position of the rotator, and the control unit controls the light emitting unit based on a detection result from the angle detector and turns off the laser beam to form a tilted reference axis indicating range. As a result, a relationship between the rotary laser irradiating system and the tilted reference axis indicating range can be easily confirmed, and a tilt direction can be set to an arbitrary direction without rotating the rotary laser irradiating system.

Further, according to the present invention, the rotary laser system comprises an angle detector for detecting a rotational position of the rotator, and the tilt driving unit comprises a first tilt driving unit for tilting the rotator in a first tilt direction and a second tilt driving unit for tilting the rotator in a direction orthogonal to the first tilt direction, and the control unit has a temporary tilt setting reference axis in an arbitrary direction, controls the light emitting unit based on a detection result from the angle detector, turns off the laser beam so as to form the tilted reference axis indicating range including the temporary tilt setting reference axis, and can change a direction of the tilted reference axis indicating range to an installing position of the photodetection device, and the control unit sets a tilt angle based on the temporary tilt setting reference axis after changing the tilted reference axis indicating range. As a result, a tilt direction can be arbitrarily set without changing a direction of the rotary laser irradiating system, a tilted reference plane can be readily formed in the set tilt direction, and an operation procedure can be simplified.

Further, according to the present invention, the photodetection device comprises a photodetection sensor and a detection notifying unit, and the detection notifying unit emits a notifying sign when the photodetection sensor detects the tilted reference axis indicating range. As a result, by just installing the photodetection device in a tilt direction or a direction orthogonal to the tilt direction, it is possible to set the tilt direction of the reference plane.

Further, according to the present invention, the rotary laser irradiating system has a first communication unit, the photodetection device has a photodetection sensor and a second communication unit, and a signal indicative of detection of the tilted reference axis indicating range by the photodetection sensor is transmitted to the first communication unit through the second communication unit. As a result, an operator who recognizes the tilted reference axis indicating range is not required on the photodetection device side, and a single operator alone who works on the rotary laser irradiating system side can suffice.

Furthermore, according to the present invention, the photodetection device comprises a photodetection device operation unit, and the rotary laser irradiating system is remotely operable by using the photodetection device operation unit. As a result, a tilted reference plane can be automatically set by a remote operation.

The invention claimed is:

1. A rotary laser irradiating system, comprising a light emitting unit for emitting a laser beam, a rotator for forming a reference plane by projecting said laser beam by rotary irradiation, a tilt driving unit for tilting said reference plane, a control unit for controlling a light emission of said light emitting unit, and a tilted axis indicating means for turning off said laser beam so as to form a tilted reference axis indicating range in a tilt setting reference axis direction for setting a tilt.

2. A rotary laser irradiating system according to claim 1, comprising an angle detector for detecting a rotational position of said rotator, wherein said control unit controls said light emitting unit based on a detection result from said angle detector and turns off said laser beam so as to form said tilted reference axis indicating range.

3. A rotary laser irradiating system according to claim 2, wherein said control unit controls said light emission of said light emitting unit so as to change a direction of said tilted reference axis indicating range based on the detection result from said angle detector.

4. A rotary laser irradiating system according to claim 1, wherein said control unit controls said light emitting unit so as to turn off said laser beam in said tilted reference axis indicating range.

5. A rotary laser irradiating system according to claim 1, wherein said control unit controls said light emitting unit so as to turn off said laser beam in front of and behind said tilted reference axis indicating range.

6. A rotary laser irradiating system according to claim 1, wherein said tilt setting reference axis direction is a tilt direction or a direction orthogonal to said tilt direction.

7. A rotary laser irradiating system according to claim 1, wherein said tilt driving unit has a first tilt driving unit for tilting said rotator in a first tilt direction and a second tilt driving unit for tilting said rotator in a second tilt direction orthogonal to said first tilt direction.

8. A rotary laser irradiating system according to claim 7, wherein said control unit drives said first tilt driving unit and said second tilt driving unit and tilts said reference plane in two directions, and forms a tilted reference plane having a composite tilt angle turns off said laser beam so as to form said tilted reference axis indicating range in said tilt setting reference axis direction in regard to said tilted reference plane.

9. A rotary laser irradiating system according to claim 7, wherein said control unit calculates a driving amount of said first tilt driving unit and a driving amount of said second tilt driving unit based on a tilt setting reference axis set to a desired direction and on a tilt angle set in regard to said tilt setting reference axis and controls said first tilt driving unit and said second tilt driving unit based on calculation results to form a composite tilted reference plane.

10. A rotary laser irradiating system according to claim 7, wherein said control unit drives said first tilt driving unit and said second tilt driving unit, changes a gradient direction of said reference plane, calculates a temporary tilt setting reference axis based on a driving amount of said first tilt driving unit and on a driving amount of said second tilt driving unit, and turns off said laser beam so as to form said tilted reference axis indicating range in a direction of said temporary tilt setting reference axis.

11. A rotary laser system, comprising a rotary laser irradiating system and a photodetection device, wherein said rotary laser irradiating system comprises a light emitting unit for emitting a laser beam, a rotator for forming a reference plane by projecting said laser beam by rotary irradiation, a tilt driving unit for tilting said reference plane, a control unit for controlling a light emission of said light emitting unit, and a tilted axis indicating means for turning off said laser beam so as to form a tilted reference axis indicating range in a tilt setting reference axis direction for setting a tilt and wherein said photodetection device is installed in a tilt direction or a direction orthogonal to said tilt direction and detects said laser beam from said rotary laser irradiating system.

12. A rotary laser system according to claim 11, wherein said rotary laser irradiating system comprises an angle detector for detecting a rotational position of said rotator, and said control unit controls said light emitting unit based on a detection result from said angle detector and turns off said laser beam to form a tilted reference axis indicating range.

13. A rotary laser system according to claim 11, comprising an angle detector for detecting a rotational position of said rotator, wherein said tilt driving unit comprises a first tilt driving unit for tilting said rotator in a first tilt direction and a second tilt driving unit for tilting said rotator in a direction orthogonal to said first tilt direction, and wherein said control unit has a temporary tilt setting reference axis in an arbitrary direction, controls said light emitting unit based on a detection result from said angle detector, turns off said laser beam so as to form said tilted reference axis indicating range including said temporary tilt setting reference axis, and can change a direction of said tilted reference axis indicating range to an installing position of said photodetection device, and wherein said control unit sets a tilt angle based on said temporary tilt setting reference axis after changing said tilted reference axis indicating range.

14. A rotary laser system according to claim 11, wherein said photodetection device comprises a photodetection sensor and a detection notifying unit, and said detection notifying unit emits a notifying sign when said photodetection sensor detects said tilted reference axis indicating range.

15. A rotary laser system according to claim 11, wherein said rotary laser irradiating system has a first communication unit, said photodetection device has a photodetection sensor and a second communication unit, and a signal indicative of detection of said tilted reference axis indicating range by said photodetection sensor is transmitted to said first communication unit through said second communication unit.

16. A rotary laser system according to claim 11, wherein said photodetection device comprises a photodetection device operation unit, and said rotary laser irradiating system is remotely operable by using said photodetection device operation unit.

* * * * *